(12) United States Patent
Grasso

(10) Patent No.: US 7,686,551 B2
(45) Date of Patent: Mar. 30, 2010

(54) TIE-DOWN ANCHOR SYSTEM AND METHOD

(75) Inventor: Andre' Grasso, Garrison, NY (US)

(73) Assignee: Black & Gray Design & Manufacturing, Inc., Garrison, NY (US)

( * ) Notice: Subject to any disclaimer, the term of this patent is extended or adjusted under 35 U.S.C. 154(b) by 531 days.

(21) Appl. No.: 11/788,664

(22) Filed: Apr. 18, 2007

(65) Prior Publication Data

US 2008/0260487 A1    Oct. 23, 2008

(51) Int. Cl.
*B60P 7/08*   (2006.01)

(52) U.S. Cl. ............... 410/107; 410/106; 410/116; 410/112

(58) Field of Classification Search ............ 410/116, 410/106, 107, 109, 111, 112; 24/265 CD, 24/115 K; 248/499
See application file for complete search history.

(56) References Cited

U.S. PATENT DOCUMENTS

| 3,412,693 | A | 11/1968 | Lewis | 105/369 |
| 4,630,982 | A | 12/1986 | Fenner | 410/102 |
| 4,907,921 | A | 3/1990 | Akright | 410/111 |
| 5,052,869 | A | 10/1991 | Hansen, II | 410/111 |
| 6,065,917 | A | 5/2000 | Shambeau et al. | 410/107 |
| 6,138,975 | A | 10/2000 | McDaid | 248/499 |
| 6,213,696 | B1 * | 4/2001 | Austin | 410/106 |

* cited by examiner

*Primary Examiner*—Stephen Gordon
(74) *Attorney, Agent, or Firm*—Clifford Kraft

(57) ABSTRACT

A family of anchor devices that include a back plate mounted behind a mounting surface with a flange mounted in front of the mounting surface and generally a ring or hook carrier member that engages an anchor ring or a hook. In several embodiments the carrier can rotate without axles pins or the like allowing the load to align the device in a direction of maximum convenience and strength. A first embodiment provides a rotating ring in a recessed retaining cup that provides for maximum flexibility. A second embodiment provides a rotating ring in a clip carrier in a raised mounting flange. A third embodiment provides a swivel insert hook carrier that can rotate. A fourth embodiment includes a ring that engages a notch in a raised carrier. Fifth and sixth embodiments provide attachments for one or multiple hooks in a fixed-mounted, non-rotating flange.

6 Claims, 11 Drawing Sheets

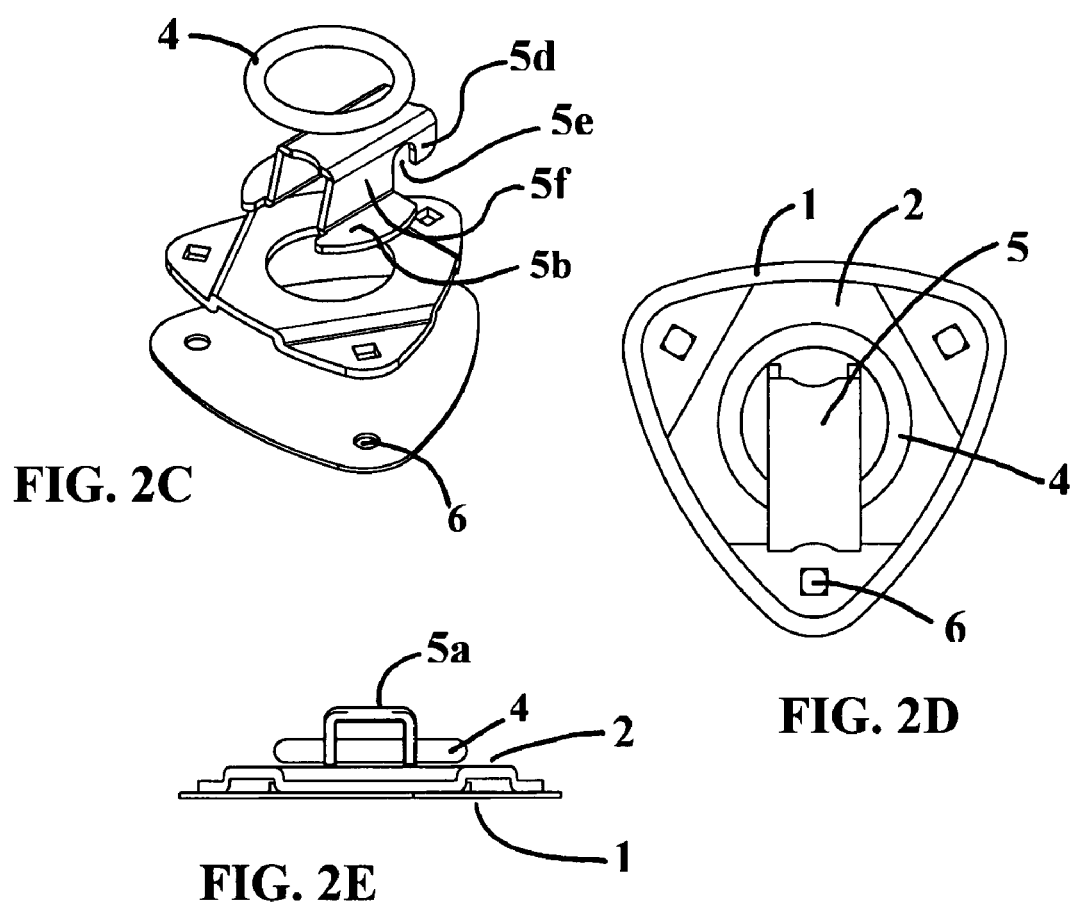

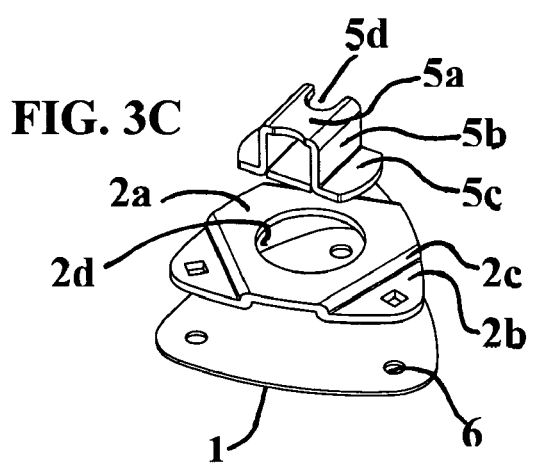
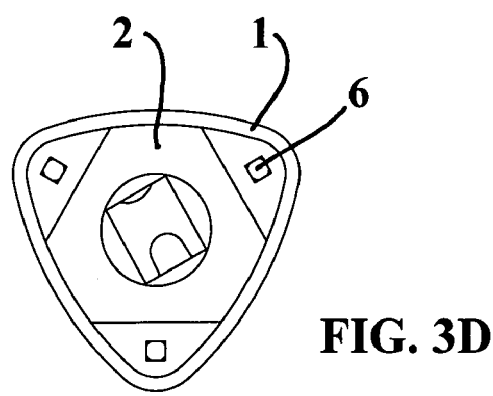
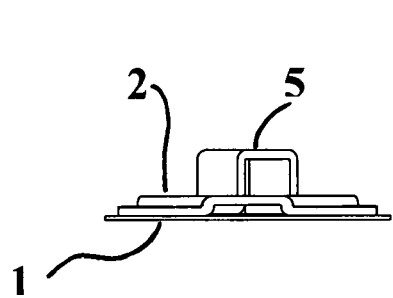
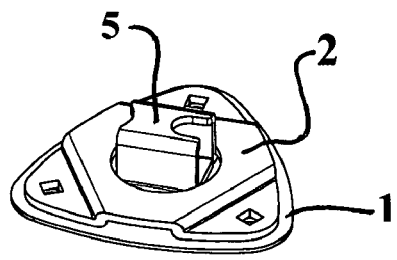
FIG. 3C
FIG. 3D
FIG. 3E
FIG. 3F

TIE-DOWN ANCHOR SYSTEM AND METHOD

BACKGROUND

1. Field of the Invention

The present invention relates generally to the field of tie-down anchors and rings and more particularly to a tie-down anchor system and method that comprises a family of related tie-downs.

2. Description of the Prior Art

Tie-down anchors and anchor rings are used to secure loads to solid structures such as tying down a motorcycle in a truck or securing any type of movable object or cargo so it cannot move especially when it is being hauled in a moving vehicle.

Several different tie-down anchors have been used in the art. For example, McDaid in U.S. Pat. No. 6,138,975 teaches an anchored tie-down that mounts in concrete. Lewis in U.S. Pat. No. 3,412,693 teaches a simple ring/plate anchoring device secured to a surface with wood screws. Fenner in U.S. Pat. No. 4,630,982 teaches a receptacle that is incorporated into an aircraft floor. Akright describes a tie-down assembly in U.S. Pat. No. 4,907,921 that houses a tie-down ring in a clamp. Hansen II in U.S. Pat. No. 5,052,869 discloses a mounting plate with a cross-bar or half-ring. Shambeau et al. disclose a rotating tie-down anchor in U.S. Pat. No. 6,065,917. Many of these prior art systems have the disadvantage of being difficult to mount because in general they require recessing in the mounting surface. Recessing necessitates cutting a large hole in the surface which possibly permanently damages the surface and weakens it. Another disadvantage of the prior art systems is that they are complex and difficult to manufacture. Finally, some of the prior art systems cannot carry the loads required of modern tie-down anchors, and many use axles or pins to achieve rotation which can lead to possible failure.

It would be advantageous to have a family of anchor tie downs that are simple mechanically, economical to manufacture from modern materials, that allow a choice between recessing into the mounting surface or simply cutting or drilling bolt holes. It would also be advantageous to avoid using any axle or pivot (pin, rivet, etc.) to achieve rotation, as prior art products do.

SUMMARY OF THE INVENTION

The present invention relates to a family of anchor devices that include a back plate mounted behind a mounting surface with a flange mounted in front of the mounting surface and generally a ring or hook carrier member that engages an anchor ring or a hook. In several embodiments of the present invention, the carrier can rotate without the use of axles or pins allowing the load to align the device in a direction of maximum convenience and strength. The lack of axles or pins as a means to achieve rotation between two objects also leads to minimal failures and maximum longevity. A first embodiment provides a rotating ring in a recessed retaining cup that provides for maximum flexibility and is intended to be relatively flush with the mounting surface. A second embodiment provides a rotating ring in a clip carrier in a raised mounting flange. A third embodiment provides a swivel insert hook carrier that can rotate. A fourth embodiment includes a ring that engages a notch in a raised carrier. Fifth and sixth embodiments provide attachments for one or multiple hooks in a fixed-mounted, non-rotating flange.

DESCRIPTION OF THE FIGURES

The following illustrations show major features of particular embodiments of the present invention:

FIG. 2C shows an exploded perspective view of the second embodiment.

FIG. 2D shows a top view of the second embodiment.

FIG. 2E shows a side view of the second embodiment.

FIG. 3C shows an exploded perspective view of the third embodiment.

FIG. 3D shows a top view of the third embodiment.

FIG. 3E shows a side view of the third embodiment.

FIG. 3F shows a top perspective view of the third embodiment.

FIG. 4A shows a perspective view of a non-recessed fourth embodiment of

FIG. 4E shows a plan view of the backing plate.

FIG. 4F shows a plan view of the top plate.

Several drawings and illustrations have been presented to aid in understanding the present invention. The scope of the present invention is not limited to what is shown in the figures.

DESCRIPTION OF THE INVENTION

The present invention relates to a family of tie-down anchors that are strong, economical to manufacture and easy to mount. Several embodiments of the present invention are presented. The scope of the present invention is not limited to only these embodiments.

Figure 1A:
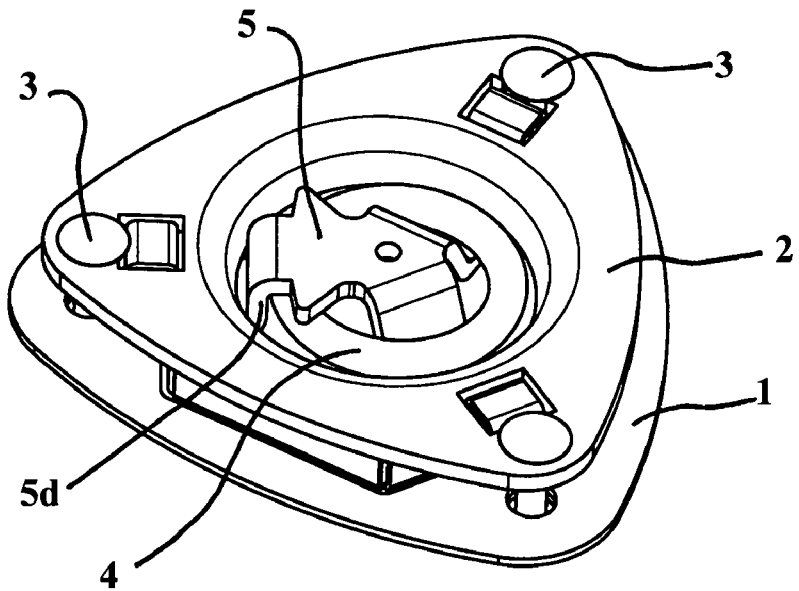
FIG. 1A shows a perspective view of a recessed first embodiment of the invention that contains a rotating tie-down ring.

Turning to FIGS. 1A-1E, a first embodiment of the invention can be seen. FIG. 1A shows a perspective view of this embodiment. This particular embodiment requires a recess in the mounting surface 7 for the anchor device. The recess must be large enough to allow the retaining cup 9 shown in FIG. 1C to pass through. A backing plate 1 that is normally mounted behind the mounting surface cooperates with a top mounting flange 2 that is secured through the surface to the plate 1 with three bolts 3 to tightly mount the device. The preferred bolt is a 5/16-18 carriage bolt; however, any bolt is within the scope of the present invention. The mounting flange 2 contains square holes 6 that receive the carriage bolts and prevent rotation when securing fasteners/hex nuts 8. The "double-square" shaped holes accept and reveal the tabs of the retaining cup and the heads of the carriage bolts function to fasten and clamp the retaining cup. These holes 6 can be adapted to allow space for attachment flanges 10 (FIG. 1C) on a retaining cup 9 when the piece is secured to the mounting surface 7.

Figure 1B:
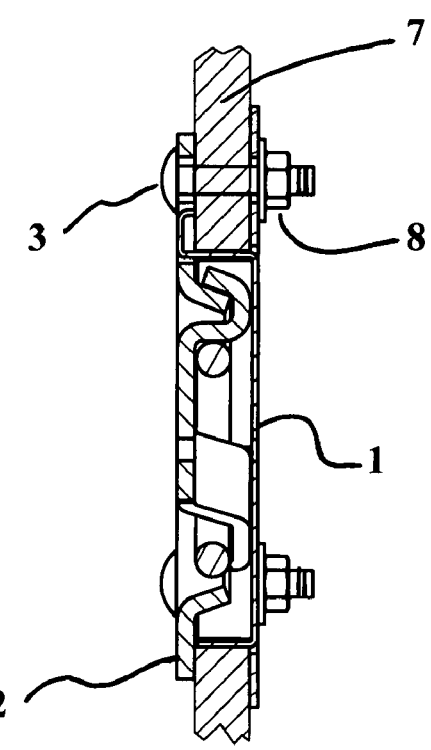
FIG. 1B shows a section of the first embodiment mounted to a surface.

An anchor ring 4 fits around the upper part of a ring clamp 5 so that the ring 4 and ring clamp 5 are trapped by the top mounting flange 2 and can rotate while being aligned by tabs 5B, around top mounting flange 2 in an axis perpendicular to the mounting surface 7, and the ring 4 is free to move in the ring clamp 5. A preferred ring is a 5/16 inch stainless steel ring; however, any ring is within the scope of the present invention. FIG. 1B shows a sectional view of this embodiment mounted to a surface 7. The bolts 3 generally pass through the mounting flange 2 and the surface 7, and are held against the backing plate 1 with nuts 8. The preferred nut is a 5/16-18 hex nut; however any nut that fits the bolt may be used including a locking nut. It is also recommended that a washer by used under the nut as is known in the art. The length of the bolts 3 should be sufficient to pass completely through the flange, surface and plate with enough length to tighten the nuts 8 securely. Different length bolts 3 can be chosen for mounting surfaces of different thicknesses.

Figure 1C:
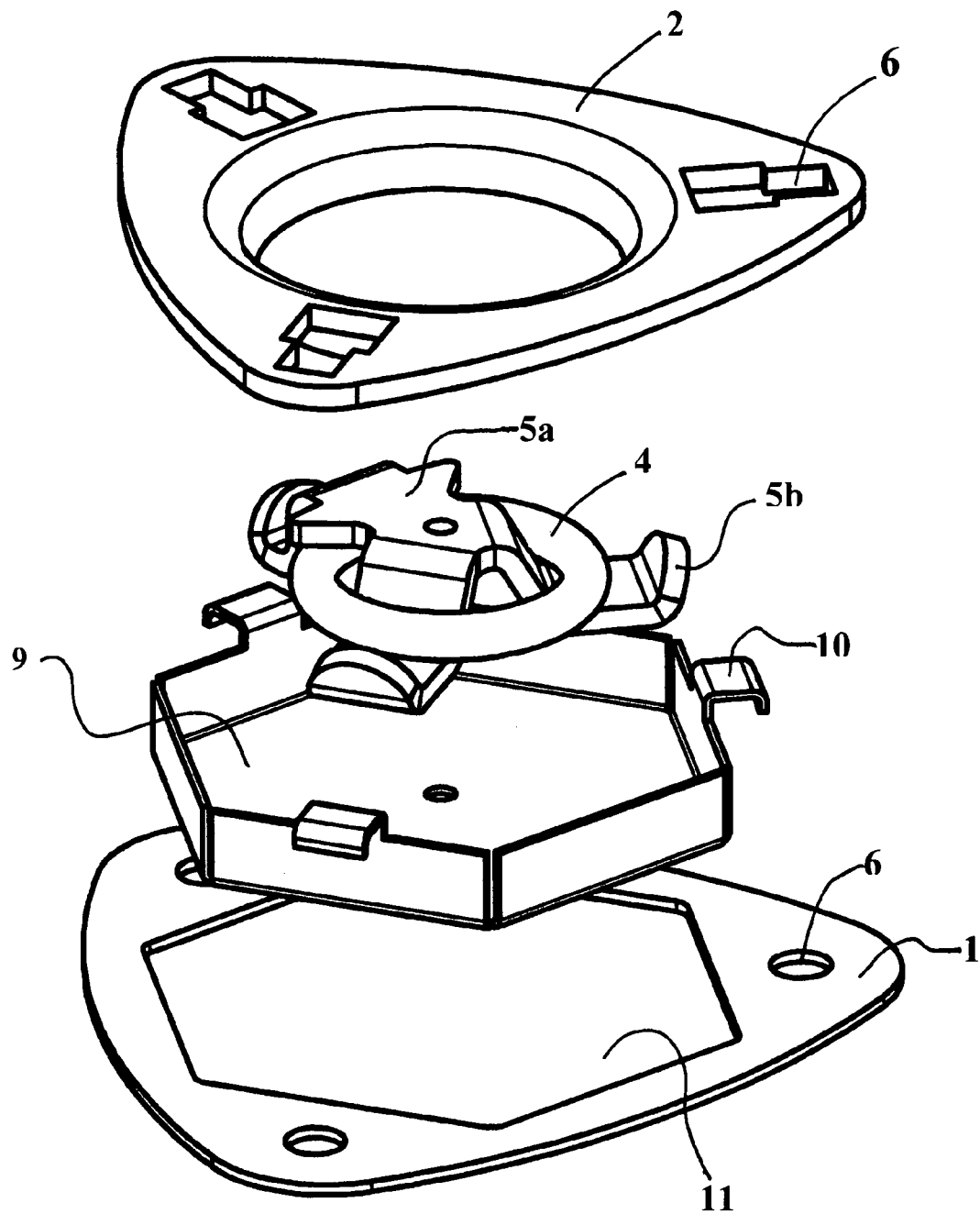
FIG. 1C shows an exploded perspective view of the first embodiment.
Figure 1D:
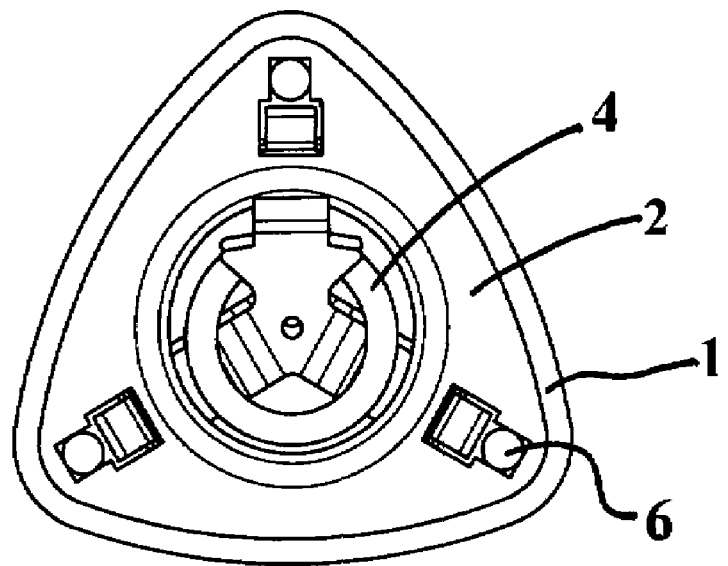
FIG. 1D is a top view of the first embodiment.
Figure 1E:
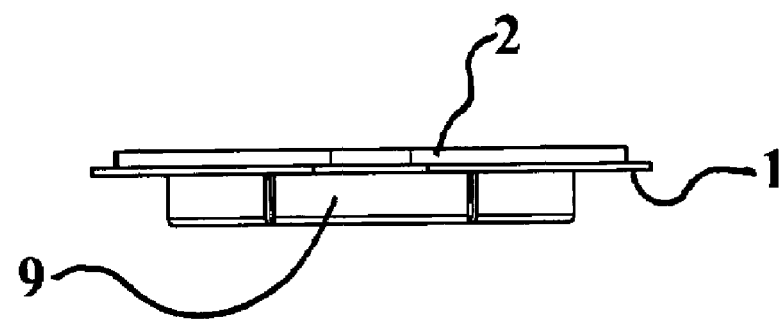
FIG. 1E shows a side view of the first embodiment.

FIG. 1C shows an exploded perspective view of the embodiment of FIGS. 1A-1B. The backing plate 1 is designed to be mounted behind the surface 7 (FIG. 1B) with a retaining cup 9 passing through the surface 7 and held in place with attachment flanges 10. the retaining cup 9 contains the ring clamp 5. The ring clamp 5 holds the anchor ring 4 in place. The top mounting flange 2 traps the ring clamp 5 and the anchor ring 4. The combined assembly of the ring 4 and ring clamp 5 are free to rotate in the retaining cup 9 aligned by the tabs/legs of 5A and rotating around the edge of top mounting flange 2. Top mounting flange 2 retains the combined assembly of the ring 4 and ring clamp 5. This rotation allows the device to adjust the ring orientation to the direction of the load (usually secured with a rope or strap). The ring clamp 5 has a flat top portion 5a and several legs 5b with three legs 5b being preferred (FIG. 1C). The ring clamp 5 also contains a protruding nose 5c (FIG. 1A) with a descending lip 5d that holds the ring 4 so that the ring 4 is free to move but cannot escape. Optionally, the retaining cup 9 can contain a drain hole (weep hole) 10 in its base to allow water or accumulated moisture to escape. FIG. 1E shows a side view of this embodiment (without the mounting surface). In normal use, the backing plate 1 and mounting flange 2 would sandwich the mounting surface 7 (as shown in FIG. 1B) and thus be separated by it. The retaining cup 9 would pass through a pre-cut recessing hole and extend through a large cutout 11 in the mounting plate (FIG. 1C). In this way, the plate 1 and flange 2 can tightly sandwich surfaces of different thicknesses. The preferred size of this embodiment is around 5×5 inches; however, the device may be provided in any convenient size.

Turning to FIGS. 2A-2E, a second embodiment of the invention can be seen. This embodiment also provides a rotating ring without the use of axles or pins; however, this embodiment does not require recessing. A flat backing plate 1, with normally no holes other than the bolt holes 6, in cooperation with a top mounting flange 2 sandwiches a surface 7 using bolts 3 and nuts 8. The flange 2 has a raised area 2a with lower supports 2b that transition through steps 2c. The raised area 2a provides space for a rotating mount 5 to be held in place but still free to rotate.

Figure 2A:
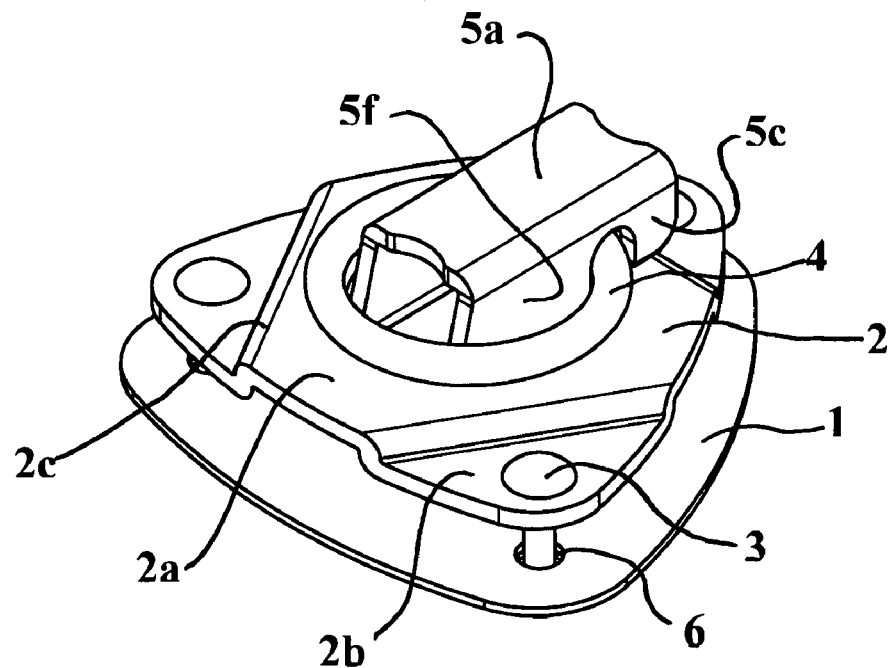
FIG. 2A shows a perspective view of a non-recessed second embodiment of the invention that contains a rotating tie-down ring.
Figure 2B:
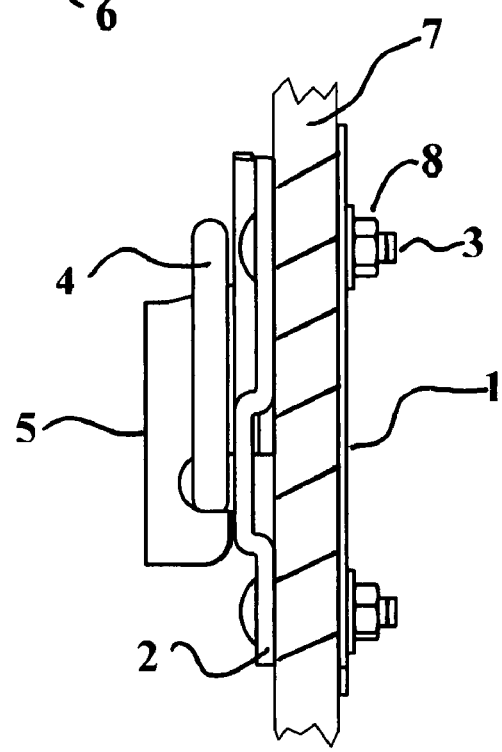
FIG. 2B shows a section of the second embodiment mounted to a surface.
Figure 3A:
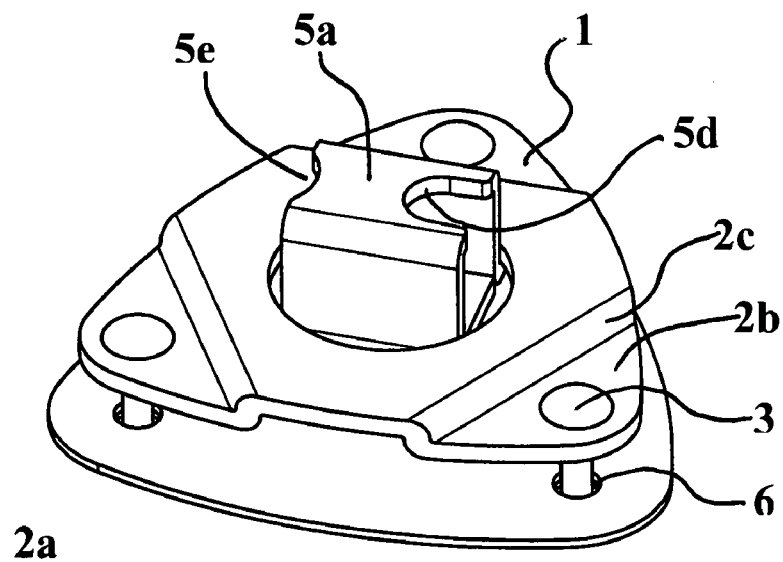
FIG. 3A shows a perspective view of a non-recessed, non-ring third embodiment of the invention that contains a rotating hook engagement.
Figure 3B:
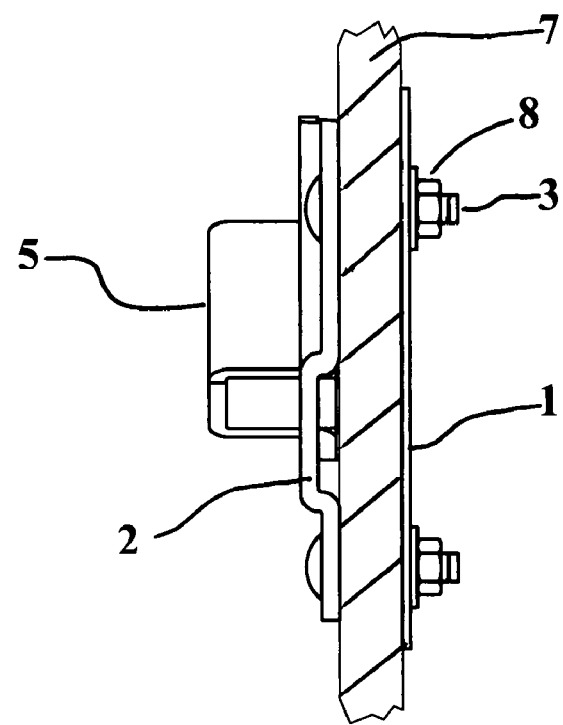
FIG. 3B shows a section of the third embodiment mounted to a surface.
Figure 4A:
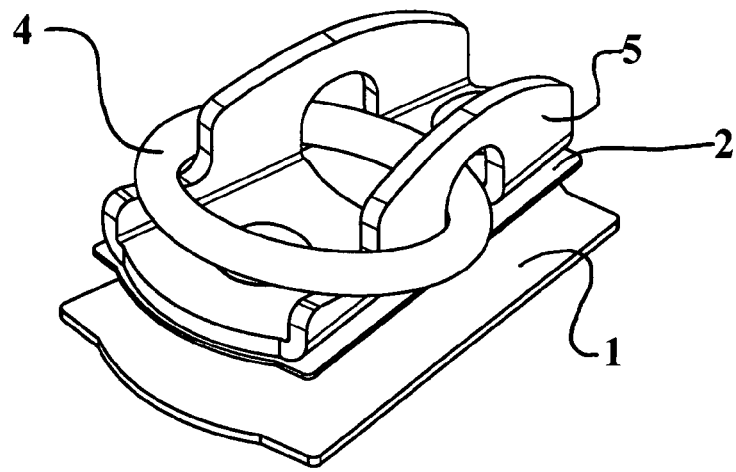
Figure 4B:
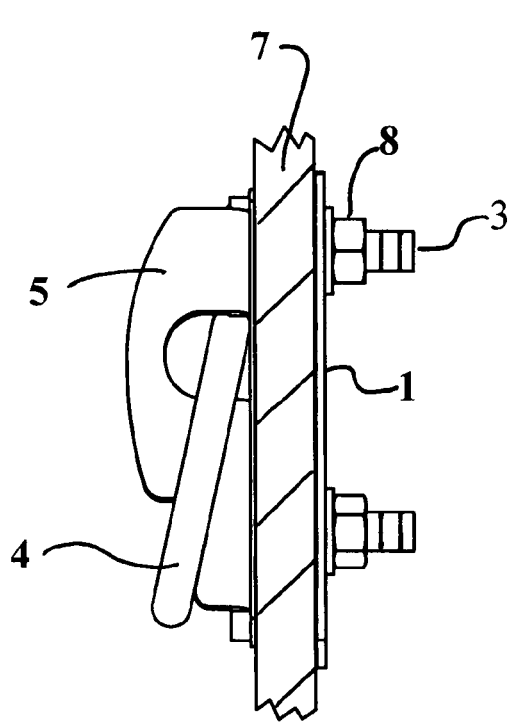
FIG. 4B shows a section of the fourth embodiment mounted to a surface.
Figure 4C:
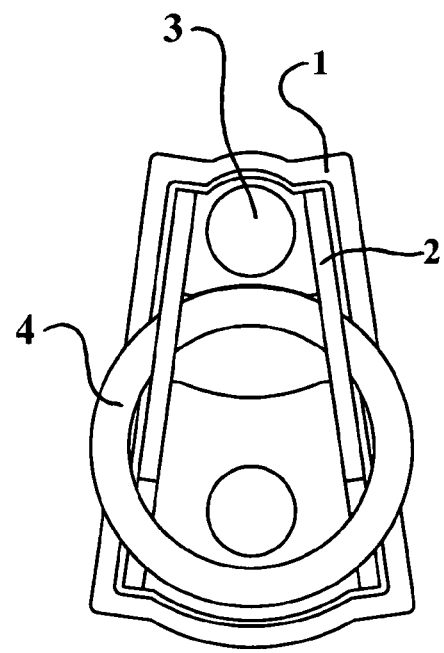
FIG. 4C shows a top view of the fourth embodiment.
Figure 4D:
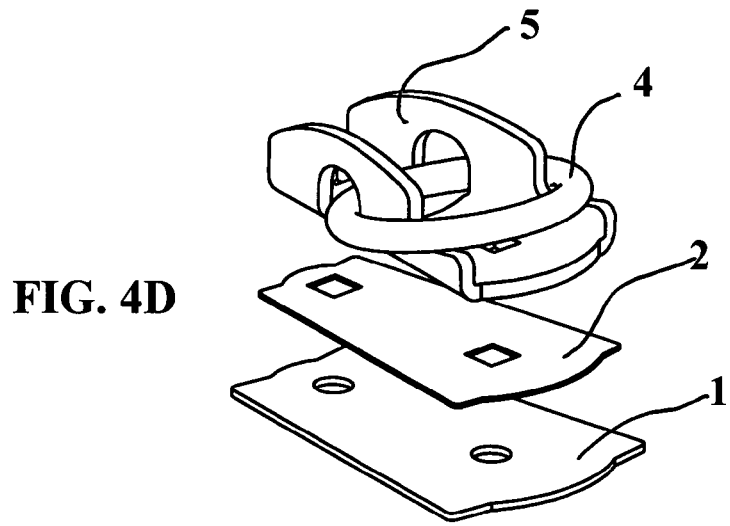
FIG. 4D shows an exploded perspective view of the fourth embodiment.
Figure 4G:
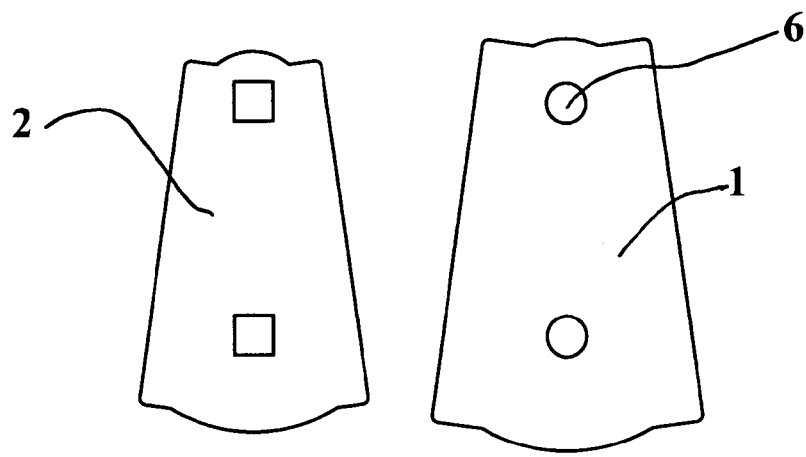
FIG. 4G shows a perspective view of the ring clip.
Figure 4G:
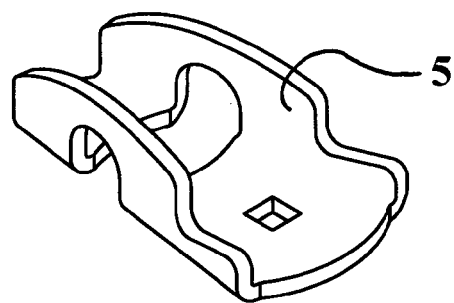
Figure 5A:
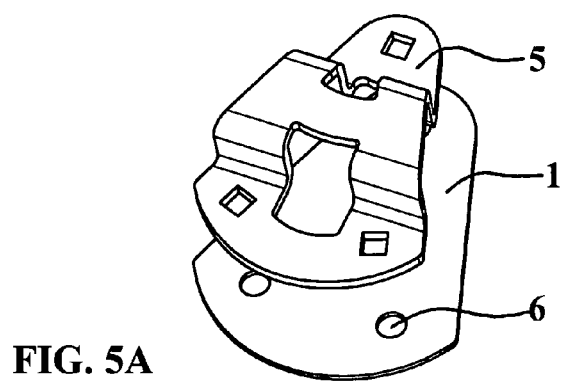
FIG. 5A shows an exploded perspective view of a fifth embodiment of the invention.
Figure 5B:
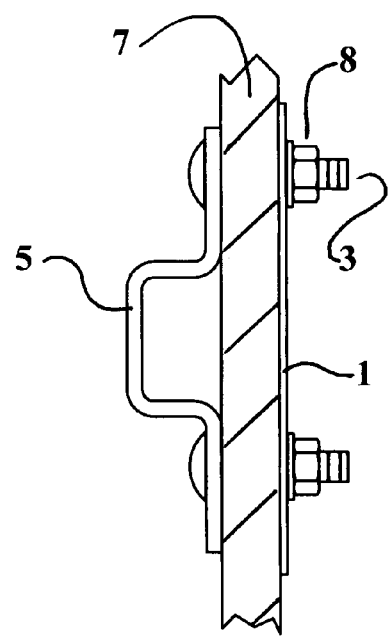
FIG. 5B shows a section of the fifth embodiment mounted to a surface.
Figure 5C:
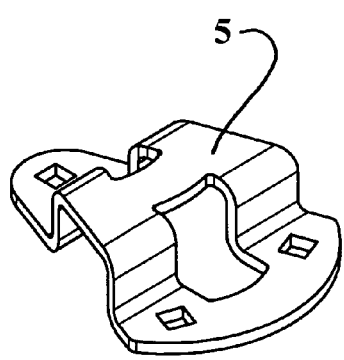
FIG. 5C shows a different perspective view of the top member of the fifth embodiment.
Figure 6A:
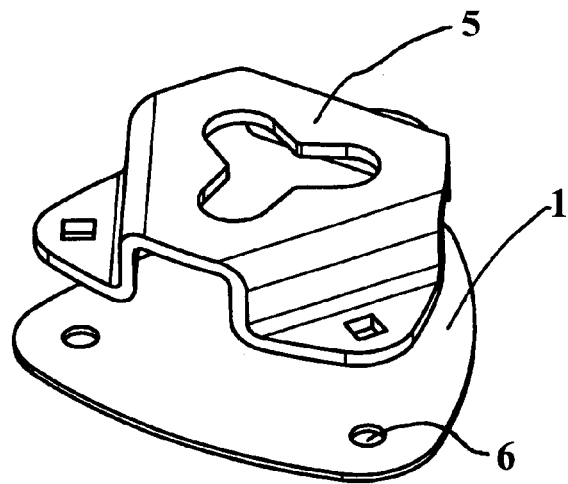
FIG. 6A shows an exploded perspective view of a sixth embodiment of the invention.
Figure 6B:
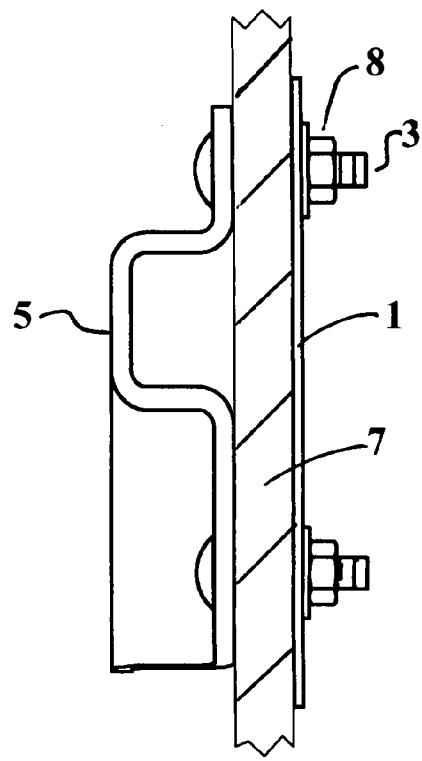
FIG. 6B shows a section of the sixth embodiment mounted to a surface.
Figure 6C:
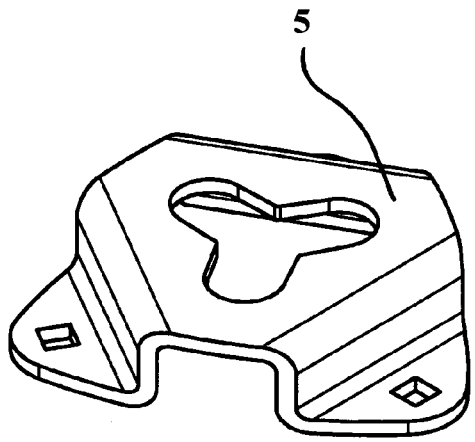
FIG. 6C shows a different perspective view of the top member of the sixth embodiment.

The rotating mount 5 has a flat top area 5a with descending sides 5f and at least two flat feet 5b (FIG. 2C). One end of this rotating mount 5 can contain a protruding nose 5c with a descending lip 5d and notch 5e. The legs 5b hold the rotating mount 5 under the mounting flange 2, while the particular shape of the mounting flange 2 allows the mount 5 to rotate by not pinching it. The notch 5e and descending lip 5d receive an anchor ring 4 in the position shown in FIG. 2A. The ring 4 is free to both rotate and swivel in the notch 5e. This second embodiment of the present invention allows the advantages of a swiveling and rotating ring mount without the use of axles or pins and the necessity of providing a recess in the mounting surface.

Turning to FIGS. 3A-3F, a third embodiment of the invention can be seen. This embodiment also provides a rotating swivel mount 5, without the use of axles or pins and this embodiment does not require recessing. A flat backing plate 1, with normally no holes other than the bolt holes 6, in cooperation with a mounting flange 2 sandwiches a surface 7 using bolts 3 and nuts 8. Similar to the second embodiment, the flange 2 has a raised area 2a with lower supports 2b that transition through steps 2c. The raised area 2a provides space for a rotating swivel mount piece 5 to be held in place but still free to rotate. The preferred bolt is a 5/16-18 carriage bolt with a washer and 5/16 nut. Any type of bolts and nuts are within the scope of the present invention.

The swivel mount 5 (as best seen in FIG. 3C) has a flat top 5a, a pair of descending walls 5b with two feet or supports 5c. It a closed flat bottom 5f that structures the swivel mount. The top of the swivel mount 5 can have an indentation 5d to receive and locate a hook. A smaller (or similarly sized) second indentation 5e can be provided on the opposite side. This particular embodiment of the present invention is designed to receive tie down hooks (such as those commonly found on the end of tie-down straps). The mounting flange 2 generally contains a large hole 2d that traps/retains the swivel mount 5 and allows the swivel mount 5 to protrude. The feet 5c of the swivel mount 5 are trapped under the higher flat surface 2a of the mounting flange 2 in such a way that the swivel mount 5 is free to rotate. This rotation allows the tie-down straps attached to the load to align the device in a direction of maximum engagement of a hook, convenience and strength.

A fourth embodiment of the present invention is shown in FIGS. 4A-4G and includes a pair of flat plates, namely a front plate 2 and a back plate 1 that engage and sandwich a mounting surface 7. A ring clip 5 mounts above the front plate 2 trapping/retaining an anchor ring 4 with a pair of bolts 3 passing through the ring clip 5, the top plate 2 and the back plate 1. These bolts 3 receive nuts 8 to mount the arrangement. An anchor ring 4 passes through a notch 5e in the ring clip 5. The ring 4 is free to rotate forward and backward in this notch 5e. The preferred bolt is a 5/16-18 carriage bolt with a washer and a 5/16-18 nut. Any type of bolts and nuts are within the scope of the present invention.

Turning to FIGS. 5A-5C and 6A-6C, a fifth and sixth embodiment of the present invention can be seen. In these embodiments, a back plate 1 and front plate 2 sandwich a mounting surface 7. The front plates have holes in a raised center section to receive hooks. In the fifth embodiment (FIGS. 5A-5C), the center section of the front plate 2 is generally U-shaped with a flat top 5a and receives a hook through holes 14 in side surfaces 5b. The front plate 5 also has flat lower flange areas 5c for support and bolting. The sixth embodiment (FIGS. 6A-6C) is similar to the fifth embodiment except that the front plate is generally triangular with a multi-way hole 15 in a raised flat surface 5a. By 3-way hole, I mean a hole that can receive more than one hook. In this embodiment, the raised flat surface descends 5b into lower flanges 5c for mounting and bolting. The multi-way hole 15 can take up to three or more hooks. The preferred number of hooks is two to three with the multi-way hole being a 2-way or 3-way hole.

All of the embodiments of the present invention can be made from steel, or other rigid materials. The preferred material for the rings is stainless steel. The choice of material is governed by the final load bearing strength desired and the cost and ease of manufacturing.

Several descriptions and illustrations of the present invention have been presented to aid in understanding the invention. One of skill in the art will recognize that numerous changes and variations are possible without departing from the spirit of the invention. Each of these changes and variations is within the scope of the present invention.

I claim:

1. A anchor device comprising a bolted backing plate and mounting flange cooperating to sandwich a mounting surface between said backing plate and said mounting flange, and further comprising:

a retaining cup that fits into a cutout in said backing plate, said retaining cup having a floor and side walls with top edges and a plurality of attachment flanges radially spaced around said top edges, wherein said attachment flanges securely hold said retaining cup in a fixed position when mounted with said attachment flanges between said backing plate and said mounting surface;

a ring clamp disposed in said retaining cup, said ring clamp having a top flat portion and a descending tip, said ring clamp also having a plurality of legs, said legs extending into said retaining cup, wherein said ring clamp is free to rotate in said retaining cup, said ring clamp being maintained in said retaining cup by said mounting flange;

an anchor ring disposed around said ring clamp wherein the anchor ring passes under the top flat portion of said ring clamp and is held in place above said plurality of legs by the descending tip of said ring clamp, said anchor ring being free to move in said ring clamp and free to rotate with said ring clamp.

2. The anchor device of claim 1 wherein said retaining cup contains a weep hole.

3. The anchor device of claim 1 wherein said anchor ring is steel or stainless steel.

4. The anchor device of claim 1 wherein the legs of said ring clamp have ascending tips.

5. The anchor device of claim 4 wherein said mounting flange contains a plurality of elongated holes, said holes accommodating both attachment bolts and the ascending tips of said ring clamp.

6. The anchor device of claim 5 wherein said anchor ring is steel or stainless steel.

* * * * *